United States Patent
Shimakata et al.

(10) Patent No.: US 8,412,471 B2
(45) Date of Patent: Apr. 2, 2013

(54) MEASUREMENT INSTRUMENT

(75) Inventors: Tetsuya Shimakata, Tokyo (JP);
Takashi Nomiyama, Tokyo (JP)

(73) Assignee: Azbil Corporation, Tokyo (JP)

( * ) Notice: Subject to any disclaimer, the term of this patent is extended or adjusted under 35 U.S.C. 154(b) by 307 days.

(21) Appl. No.: 12/865,553

(22) PCT Filed: Jan. 14, 2009

(86) PCT No.: PCT/JP2009/050368
§ 371 (c)(1),
(2), (4) Date: Jul. 30, 2010

(87) PCT Pub. No.: WO2009/096225
PCT Pub. Date: Aug. 6, 2009

(65) Prior Publication Data
US 2010/0332156 A1    Dec. 30, 2010

(30) Foreign Application Priority Data

Jan. 31, 2008    (JP) ................................ 2008-020723

(51) Int. Cl.
*G01L 9/00*    (2006.01)
*G06F 19/00*    (2011.01)
(52) U.S. Cl. ............................. 702/50; 341/162; 702/85
(58) Field of Classification Search ............ 702/45, 702/47, 50, 85, 89, 98, 99, 100, 138, 176; 73/706, 716; 340/870.16; 341/118, 155, 341/162; 700/19
See application file for complete search history.

(56) References Cited

U.S. PATENT DOCUMENTS

| | | | |
|---|---|---|---|
| 4,841,296 A | 6/1989 | Kadoya | |
| 5,754,452 A * | 5/1998 | Pupalaikis | 702/85 |
| 6,574,515 B1 | 6/2003 | Kirkpatrick et al. | |
| 7,889,111 B2 * | 2/2011 | Kawahito | 341/162 |

FOREIGN PATENT DOCUMENTS

| | | |
|---|---|---|
| JP | 62-179097 A | 8/1987 |
| JP | 2-88921 A | 3/1990 |
| JP | 4-306021 A | 10/1992 |
| JP | 7-162345 A | 6/1995 |
| JP | 2003-533809 A | 11/2003 |
| JP | 2004-85288 A | 3/2004 |
| JP | 2006-309693 A | 11/2006 |
| WO | 01/88644 A2 | 11/2001 |

* cited by examiner

*Primary Examiner* — John H Le
(74) *Attorney, Agent, or Firm* — Troutman Sanders LLP

(57) ABSTRACT

One A/D converter and the other A/D converter have a common power supply voltage and sample an A/D conversion value at short time intervals and at a long time intervals, respectively. Both the A/D converter and the A/D converter are set in a constant active state (continuous conversion mode). This allows the total consumption current combining the consumption current of the A/D converter and the consumption current of the A/D converter to be constant, so that the power supply voltage is stabilized and a stable A/D conversion value can be obtained from each of the A/D converters.

4 Claims, 10 Drawing Sheets

MEASUREMENT INSTRUMENT

CROSS REFERENCE TO PRIOR APPLICATIONS

This application is a U.S. National Phase application under 35 U.S.C. §371 of International Application No. PCT/JP2009/050368, filed on Jan. 14, 2009 and claims benefit of priority to Japanese Patent Application No. 2008-020723, filed on Jan. 31, 2008. The International Application was published in Japanese on Aug. 6, 2009 as WO 2009/096225 under PCT Article 21(2). All these applications are herein incorporated by reference.

FIELD OF TECHNOLOGY

The present invention relates to a measuring device, such as a differential pressure transmitting device.

PRIOR ART

Conventionally differential pressure transmitting devices have been used as devices for sensing and transmitting differential pressures of fluids. (See, for example, Japanese Unexamined Patent Application Publication H2-88921.) This differential pressure transmitting device comprises a differential pressure sensor, an A/D converting device, and a processing device, where a measuring diaphragm, which is a body that deforms with pressure, is provided within the sensor portion of the differential pressure sensor, and a pressure chamber A and a pressure chamber B are provided on both sides of this measuring diaphragm.

In this differential pressure transmitting device, a fluid pressure Pa is conveyed through a non-compressible fluid (such as silicone oil) to the pressure chamber A, and a fluid pressure Pb is conveyed through a non-compressible fluid (such as silicone oil) to a pressure chamber B. Doing so causes the measuring diaphragm to deform in accordance with |Pa-Pb| towards the side of the pressure chamber having the lower fluid pressure, where the state of deformation of the measuring diaphragm is sensed by a strain gauge to produce an electric signal (an analog signal) in accordance with the differential pressure by a converting device, where the electric signal thus produced is sent to an A/D converting device to convert to a digital signal.

The processing device samples A/D conversion value that has been converted into the digital signal by the A/D converting device with each of a specific sampling period, calculates the measured value $\Delta P$ for the differential pressure by performing a variety of calculating processes such as a smoothing calculation, a square root calculation, a first-order delay calculation (a damping calculation), or the like, on the sampled A/D conversion value, and outputs the calculated differential pressure measurement value $\Delta P$.

Additionally, in this differential pressure transmitting device, in order to increase the precision of the measured value $\Delta P$, the static pressure, temperature, and the like are measured as physical quantities that indicate changes in the environment that influence the differential pressure that is sensed by the differential pressure sensor, and corrections are performed on the measured value $\Delta P$ for the differential pressure based on the measured static pressure, temperature, or the like. In this case, in the aforementioned Document 1, a single A/D converting device is used to convert the differential pressure, the static pressure, and the temperature into digital signals, and the A/D conversion values wherein these have been converted into digital signals are sampled.

However, the sampling periods for the static pressure, temperature, or the like, are longer periods than the sampling period for the differential pressure. That is, because the changes in the static pressure, temperature, and the like are more gradual than those for the differential pressure, sampling is performed with a short period for the differential pressure, and sampling is performed with long periods for the static pressure and the temperature.

However, in applications that require high-speed differential pressure measurements, it is not possible to accommodate the increase in speed when sampling the differential pressure, the static pressure, and the temperature with a single A/D converting device.

Given this, the present applicant has thought of achieving an increase in speed of the differential pressure measurements by providing two A/D converting devices, where the differential pressure is sampled with a short period by one A/D converting device, and the static pressure and temperature are sampled with a long period by the other A/D converting device. FIG. 9 illustrates one example thereof.

In FIG. 9: 10 is a first A/D converting device; 20 is a second A/D converting device; 30 is a differential pressure sensor; 40 is a static pressure sensor; 50 is temperature sensor: and 60 is a processing device (MPU); wherein: an electric signal (an analog signal) in accordance with the differential pressure is applied from the differential pressure sensor to be the first A/D converting device; an electric signal (an analog signal) in accordance with the static pressure is applied by the static pressure sensor 40 and an electric signal (an analog signal) in accordance with the temperature is applied from the temperature sensor 50, to the second A/D converting device 20.

The first A/D converting device 10 converts the electric signal in accordance with the differential pressure from the differential pressure sensor 30 into a digital signal. The second A/D converting device 20 converts the analog signal in accordance with the static pressure from the static pressure sensor 40, and the analog signal in accordance with the temperature from the temperature sensor 50, into digital signals.

The processing device 60 samples, with a short period, the A/D conversion value that has been converted into a digital signal by the first A/D converting device 10, samples, with a long period, the A/D conversion values that have been converted into digital signals by the second A/D converting device 20, and calculates a measured value $\Delta P$ for the differential pressure based on the A/D conversion values sampled from the first A/D converting device 10 and the A/D conversion values sampled from the second A/D converting device 20.

In this differential pressure transmitting device, a common power supply voltage Vcc is applied to both the A/D converting devices 10 and 20, where the A/D converting device 10 is put into a constantly operating mode (a continuous converting mode) and the A/D converting device 20 is put into an intermittent operating mode (an intermittent converting mode). That is, the A/D converting device 10 performs sampling with a short period, and this is constantly performing the A/D converting operation. In contrast, the A/D converting device 20 performs sampling with a long period, and thus, for the purposes of reducing the electric current consumed, performs the A/D conversion operations intermittently, and goes into a standby state when not performing the A/D conversion operation.

However, in this method, the power supply voltage Vcc will vary because while the A/D converting device 10 is in a constantly operating state, the A/D converting device 20 is in an intermittently operating state, producing a problem in that it is not possible to obtain stable A/D conversion values. This problem will be explained referencing the timing charts illustrated in FIG. 10A through FIG. 10E.

FIG. 10A illustrates the changes in the current Ia1 consumed in the first A/D converting device 10; FIG. 10B illustrates the changes in the current Ia2 consumed in the second A/D converting device 20; FIG. 10C illustrates the changes in the total current Ia consumed, wherein the current Ia1 consumed by the first A/D converting device 10 and the current Ia2 consumed of the second A/D converting device 20 are added together; FIG. 10D illustrates the changes in the A/D conversion value CNT1 of the first A/D converting device 10; and FIG. 10E illustrates the changes in the A/D conversion value CNT2 of the second A/D converting device 20. In the present example, the currents consumed during the A/D conversion operations of the A/D converting devices 10 and 20 (when in an operating state) are 1 mA, where the currents consumed when in the A/D conversion operation standby (when in the standby state) are 0.5 mA.

In this case, the total current Ia consumed during the conversion operation of the A/D converting device 20 will be 2 mA, and the total current Ia consumed during the A/D conversion operation standby of the A/D converting device 20 will be 1.5 mA, so the power supply voltage Vcc will fluctuate, causing the A/D conversion value CNT1 of the first A/D converting device 10 to fluctuate. The processing device 60 samples the A/D conversion value CNT1 over a short period (that is, at high speed), and thus the fluctuations of the A/D conversion value CNT1 of the first A/D converting device 10 will be captured as-is. This makes it impossible to obtain a stable A/D conversion value CNT1.

Note that the A/D conversion value CNT2 of the second A/D converting device 20 is sampled intermittently for the value near the completion of the A/D conversion, that is, is sampled at the point in time at which the total current Ia consumed has stabilized, and thus there is no problem because a stabilized A/D conversion value CNT2 is captured by the processing device 60.

The present invention is to solve this type of problem, and thus the object thereof is to provide a measuring device capable of obtaining stabilized A/D conversion values from both A/D converting devices, wherein there is a common power supply voltage, when sampling A/D conversion values at a short period for one of the A/D converting devices and a long period for the other A/D converting device.

SUMMARY OF THE INVENTION

In order to achieve this object, the invention includes a first A/D converting device, which receives the supply of a power supply voltage and is in a constantly operating state, for converting an inputted analog signal into a digital signal; a second A/D converting device, which receives a common power supply voltage, with the power supply voltage to the first A/D converting device being the common power supply voltage, to be in a constantly operating state, for converting an inputted analog signal into a digital signal; and a processing device for sampling, with a first period, an A/D converted value that has been converted into a digital signal by the first A/D converting device, and for sampling, with a second period that is longer than the first period, an A/D conversion value that has been converted into a digital signal in the second A/D converting device.

Given the present invention, both the first A/D converting device and the second A/D converting device are always in the operating state, causing the total current consumed, which is the combination of the current consumed by the first A/D converting device and the current consumed by the second A/D converting device, to be constant. This makes it possible to obtain stabilized A/D conversion values from both of the A/D converting devices by reducing the fluctuations in the A/D conversion values of the first A/D converting device by stabilizing the power supply voltage.

The invention also includes a differential pressure sensor for sensing a pressure differential between fluids; an environment sensor for sensing a physical quantity that indicates a change in an environment that has an effect on the differential pressure sensed by the differential pressure sensor; a first A/D converting device, which receives the supply of a power supply voltage and is in a constantly operating state, for converting an inputted analog signal from the differential pressure sensor into a digital signal; a second A/D converting device, which receives a common power supply voltage, with the power supply voltage to the first A/D converting device being the common power supply voltage, to be in a constantly operating state, for converting an inputted analog signal from the environment sensor into a digital signal; and a processing device for sampling, with a first period, an A/D converted value that has been converted into a digital signal by the first A/D converting device, and for sampling, with a second period that is longer than the first period, an A/D conversion value that has been converted into a digital signal in the second A/D converting device.

Given the present invention, both the first A/D converting device and the second A/D converting device are always in the operating state, causing the total current consumed, which is the combination of the current consumed by the first A/D converting device and the current consumed by the second A/D converting device, to be constant. This makes it possible to obtain stabilized A/D conversion values from both of the A/D converting devices by reducing the fluctuations in the A/D conversion values of the first A/D converting device by stabilizing the power supply voltage, making it possible to obtain a precise and stable measured value for a differential pressure by correcting the pressure differential of the fluid, sensed by the differential pressure sensor, using the physical quantity that indicates the change in the environment that has an impact on the sensed pressure differential.

The invention further has a differential pressure sensor for sensing a pressure differential between fluids; a plurality of environment sensors for sensing physical quantities that indicates changes in an environment that has an effect on the differential pressure sensed by the differential pressure sensor; a first A/D converting device, which receives the supply of a power supply voltage and is in a constantly operating state, for converting an inputted analog signal from the differential pressure sensor into a digital signal; a second A/D converting device, which receives a common power supply voltage, with the power supply voltage to the first A/D converting device being the common power supply voltage, to be in a constantly operating state, for converting, into digital signals, inputted analog signals that are in accordance with physical quantities sensed by the plurality of environment sensors; and a processing device for sampling, with a first period, an A/D converted value that has been converted into a digital signal by the first A/D converting device, and for sampling, with a second period that is longer than the first period, an A/D conversion value that has been converted into a digital signal in the second A/D converting device.

Given the present invention, both the first A/D converting device and the second A/D converting device are always in the operating state, causing the total current consumed, which is the combination of the current consumed by the first A/D converting device and the current consumed by the second A/D converting device, to be constant. This makes it possible to obtain stabilized A/D conversion values from both of the A/D converting devices by reducing the fluctuations in the A/D conversion values of the first A/D converting device by stabilizing the power supply voltage, making it possible to obtain a precise and stable measured value for a differential pressure by correcting the pressure differential of the fluid, sensed by the differential pressure sensor, using the plurality of physical quantities that indicates the change in the environment that has an impact on the sensed pressure differential.

The invention includes a differential pressure sensor for sensing a pressure differential between fluids; a plurality of environment sensors for sensing physical quantities that indicates changes in an environment that has an effect on the differential pressure sensed by the differential pressure sensor; a first A/D converting device, which receives the supply of a power supply voltage and is in a constantly operating state, for converting an inputted analog signal from the differential pressure sensor into a digital signal; a plurality of second A/D converting devices, each receiving a common power supply voltage, with the power supply voltage to the first A/D converting device being the common power supply voltage, to be in a constantly operating state, for converting, into respective digital signals, respective inputted analog signals that are in accordance with physical quantities sensed by the plurality of environment sensors; and a processing device for sampling, with a first period, an A/D converted value that has been converted into a digital signal by the first A/D converting device, and for sampling, with a second period that is longer than the first period, A/D conversion values that have been converted into a digital signals in the plurality of second A/D converting devices.

Given the present invention, both the first A/D converting device and the second A/D converting device are always in the operating state, causing the total current consumed, which is the combination of the current consumed by the first A/D converting device and the currents consumed by the plurality of second A/D converting devices, to be constant. This makes it possible to obtain stabilized A/D conversion values from both of the A/D converting devices by reducing the fluctuations in the A/D conversion values of the first A/D converting device by stabilizing the power supply voltage, making it possible to obtain a precise and stable measured value for a differential pressure by correcting the pressure differential of the fluid, sensed by the differential pressure sensor, using the plurality of physical quantities that indicates the change in the environment that has an impact on the sensed pressure differential.

The invention also has a differential pressure sensor for sensing a pressure differential between fluids; a plurality of environment sensors for sensing physical quantities that indicates changes in an environment that has an effect on the differential pressure sensed by the differential pressure sensor; a first A/D converting device, which receives the supply of a power supply voltage and is in a constantly operating state, for converting an inputted analog signal from the differential pressure sensor into a digital signal; a plurality of second A/D converting devices, each receiving a common power supply voltage, with the power supply voltage to the first A/D converting device being the common power supply voltage, to be in intermittent operating states wherein the schedules combine so that the total value for the sum of the currents consumed thereby will be a constant value, for converting, into respective digital signals, respective inputted analog signals that are in accordance with physical quantities sensed by the plurality of environment sensors; and a processing device for sampling, with a first period, an A/D converted value that has been converted into a digital signal by the first A/D converting device, and for sampling, with a second period that is longer than the first period, A/D conversion values that have been converted into a digital signals in the plurality of second A/D converting devices.

Given the present invention, the first A/D converting device is always in the operating state and the second A/D converting devices are in intermittent operating states wherein the schedules combine so that the total value for the sum of the currents consumed thereby will be a constant value, causing the total current consumed, which is the combination of the current consumed by the first A/D converting device and the currents consumed by the plurality of second A/D converting devices, to be constant. This makes it possible to obtain stabilized A/D conversion values from both of the A/D converting devices by reducing the fluctuations in the A/D conversion values of the first A/D converting device by stabilizing the power supply voltage, making it possible to obtain a precise and stable measured value for a differential pressure by correcting the pressure differential of the fluid, sensed by the differential pressure sensor, using the plurality of physical quantities that indicates the change in the environment that has an impact on the sensed pressure differential.

In the present invention, the first A/D converting device and the second A/D converting device are placed into the constantly operating state, or the first A/D converting device and all of the second A/D converting devices are placed into the constantly operating state, or the first A/D converting device is placed into the constantly operating state and the plurality of second A/D converting devices are placed into intermittent operating states wherein the schedules combine so that the total value for the sum of the currents consumed thereby will be a constant value, to stabilize the power supply voltage by causing the total current consumed, which is the sum of the current consumed by the first A/D converting device and the current consumed by second A/D converting device (or the currents consumed by the plurality of second A/D converting devices), to be a constant value, to reduce the fluctuations in the A/D conversion value from the first A/D converting device that performs sampling with a short period, making it possible to obtain stabilized A/D conversion values from all of the A/D converting devices.

DETAILED DESCRIPTION OF THE INVENTION

Figure 1:
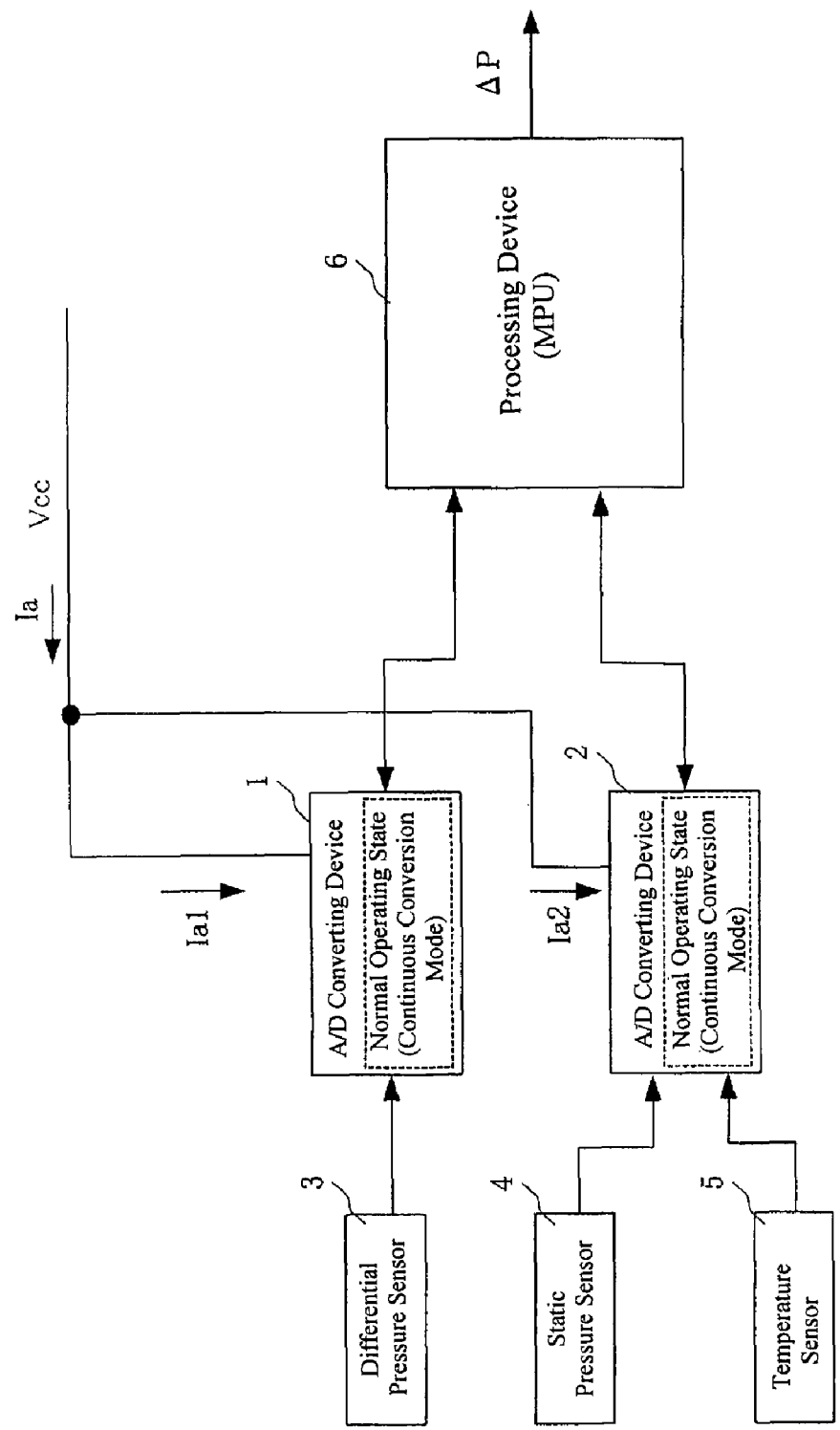
FIG. 1 is a diagram illustrating the critical components of a differential pressure transmitting device that is one example of a measuring device according to the present invention.

The present invention will be described in detail based on the drawings, below. FIG. 1 is a diagram illustrating the components in a differential pressure transmitting device that is one example of a measuring device according to the present invention. In the figure, 1 is a first A/D converting device, 2 is a second A/D converting device, 3 is a differential pressure sensor, 4 is a static pressure sensor, 5 is a temperature sensor, and 6 is a processing device, corresponding to the first A/D converting device 10, the second A/D converting device 20, the differential pressure sensor 30, the static pressure sensor 40, the temperature sensor 50, and the processing device 60 in the differential pressure transmitting device illustrated in FIG. 9.

Figure 9:
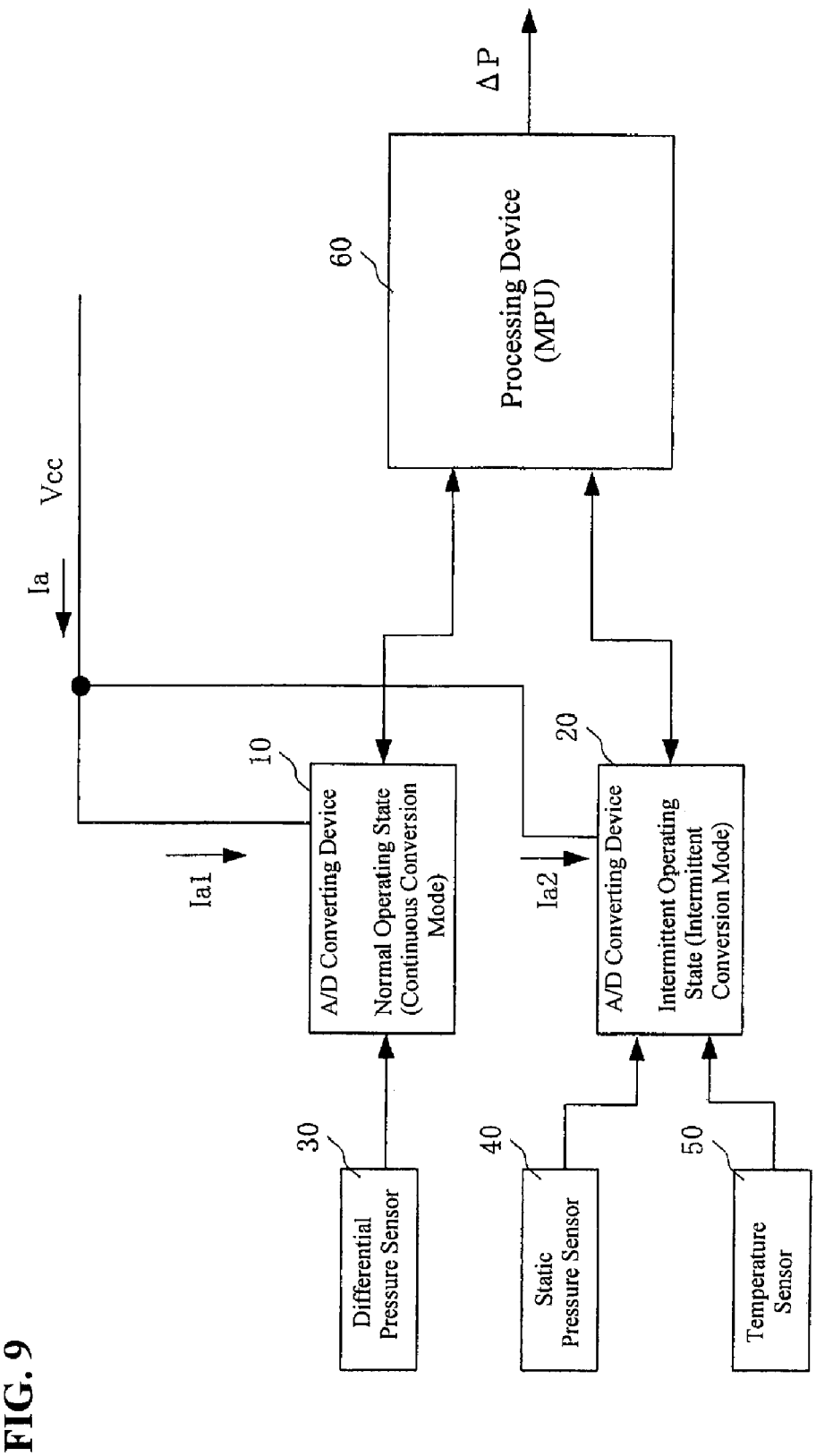
FIG. 9 is a diagram illustrating the critical components of a differential pressure transmitting device contemplated by the present inventors as a prerequisite technology prior to arriving at the present invention.
Figure 10A:
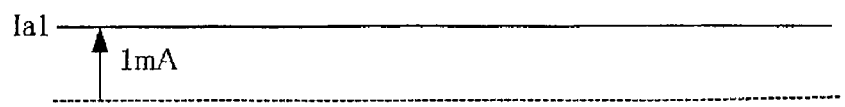
FIG. 10A is a diagram illustrating the changes in the current Ia1 consumed by a first A/D converting device in the differential pressure transmitting device illustrated in FIG. 9.
Figure 10B:
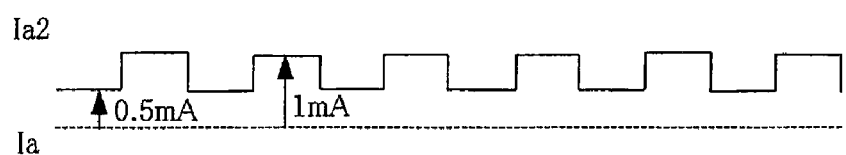
FIG. 10B is a diagram illustrating the changes in a current Ia2 consumed by a second A/D converting device in the differential pressure transmitting device illustrated in FIG. 9.
Figure 10C:
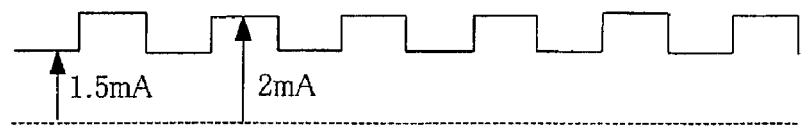
FIG. 10C is a diagram illustrating the changes in the total current Ia consumed that is the sum of the current Ia1 consumed by a first A/D converting device and the current Ia2 consumed by the second A/D converting device in the differential pressure transmitting device illustrated in FIG. 9.
Figure 10D:
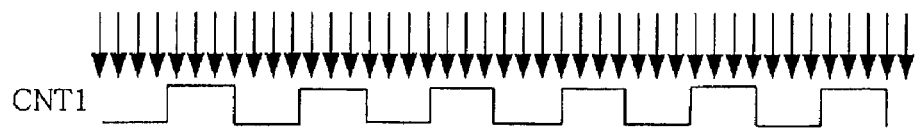
FIG. 10D is a diagram illustrating the changes in the A/D conversion value CNT1 by a first A/D converting device in the differential pressure transmitting device illustrated in FIG. 9.
Figure 10E:
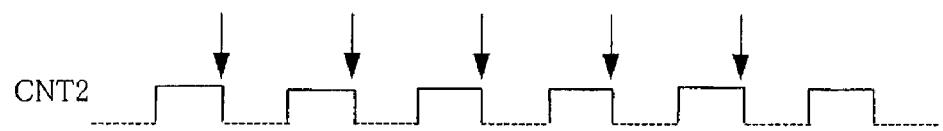
FIG. 10E is a diagram illustrating the changes in the A/D conversion value CNT2 by a second A/D converting device in the differential pressure transmitting device illustrated in FIG. 9.

In the differential pressure transmitting device illustrated in FIG. 9, the A/D converting device 10 is in a constantly operating state (a continuous converting mode), and the A/D converting device 20 is in an intermittently operating state (an intermittent converting mode), but in the present example, both the A/D converting device 1 and the A/D converting device 2 are in the constantly operating state (the continuous converting mode).

Note that the continuous converting mode may be set individually to the A/D converting device 1 and the A/D converting device 2 at the time of shipment from the factory, or instructions may be applied individually by the processing device 6.

Figure 2A:
FIG. 2A is a diagram illustrating the changes in the current Ia1 consumed by a first A/D converting device in the differential pressure transmitting device illustrated in FIG. 1.
Figure 2B:
FIG. 2B is a diagram illustrating the changes in the current Ia2 consumed by a second A/D converting device in the differential pressure transmitting device illustrated in FIG. 1.
Figure 2C:
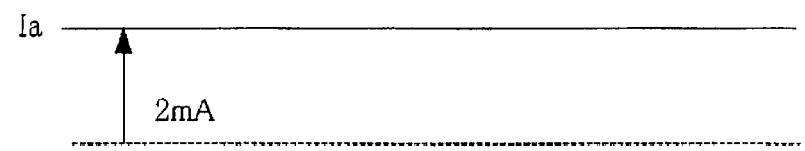
FIG. 2C is a diagram illustrating the changes in the total current Ia consumed that is the sum of the current Ia1 consumed by a first A/D converting device and the current Ia2 consumed by the second A/D converting device in the differential pressure transmitting device illustrated in FIG. 1.
Figure 2D:
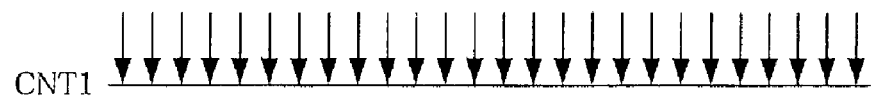
FIG. 2D is a diagram illustrating the changes in the A/D conversion value CNT1 by a first A/D converting device in the differential pressure transmitting device illustrated in FIG. 1.
Figure 2E:
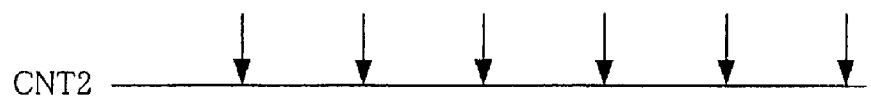
FIG. 2E is a diagram illustrating the changes in the A/D conversion value CNT2 by a second A/D converting device in the differential pressure transmitting device illustrated in FIG. 1.

FIG. 2A illustrates the changes in the current Ia1 consumed by the first A/D converting device 1; FIG. 2B illustrates the changes in the current Ia2 consumed by the second A/D converting device 2; FIG. 2C illustrates the changes in the total current Ia consumed by the combination of the current Ia1 consumed by the first A/D converting device 1 and the current Ia2 consumed by the second A/D converting device 2; FIG. 2D illustrates the changes in the A/D conversion value CNT1 of the first A/D converting device 1; in FIG. 2E illustrates the changes in the A/D conversion value CNT2 by the second A/D converting device 2. In this example, the currents consumed during the A/D conversion operations (when in an operating state) of the A/D converting devices 1 and 2 are each 1 mA.

In this case, because both the A/D converting device 1 and the A/D converting device 2 are in the always operating state, the total current consumed Ia, which is the total of the current consumed Ia1 by the A/D converting device 1 and the current consumed Ia2 by the A/D converting device 2 will be Ia=Ia1+Ia2=1 mA+1 mA=2 mA, which will always be constant.

As a result, the power supply voltage Vcc will be stabilized, decreasing the fluctuations in the A/D conversion value CNT1 by the A/D converting device 1, as illustrated in FIG. 2D. Note that, in this case, as illustrated in FIG. 2E, the A/D conversion value CNT2 of the second A/D converting device 2 will also be obtained continuously, and there will also be no fluctuations in the A/D conversion value CNT2 of the second A/D converting device 2.

The processing device 6 samples the A/D conversion value CNT1 with a short period, and samples the A/D conversion value CNT2 with a long period. In this case, the fluctuations in the A/D conversion value CNT1 of the A/D converting device 1 are reduced, thus making it possible for a stabilized A/D conversion value CNT1 to be obtained by the processing device 6. Additionally, because no fluctuations are produced in the A/D conversion value CNT2 of the A/D converting device 2 either, and because the values near to the completion of the A/D conversion by the A/D converting device 2 are sampled, a stabilized A/D conversion value CNT2 can be obtained by the processing device 6.

In this way a stabilized A/D conversion value can be obtained from either of the A/D converting devices, and the pressure differential of the fluids sensed by the differential pressure sensor 3 are corrected by the static pressure from the static pressure sensor 4 and by the temperature from the temperature sensor 5, thus making it possible to calculate a precise and stabilized measured value ΔP for the differential pressure.

Note that while in the present example an electric signal in accordance with the static pressure from the pressure sensor 4 and an electric signal in accordance with the temperature from the temperature sensor 5 are applied to the A/D converting device 2, conversely, the electric signal in accordance with the static pressure from the static pressure sensor 4 alone may be applied to the A/D converting device 2, or the electric signal in accordance with the temperature from the temperature sensor 5 alone may be applied to the A/D converting device 2. That is, the differential pressure may be corrected for the static pressure alone, or the differential pressure may be corrected for the temperature alone.

Moreover, the physical quantity that indicates the change in the environment that effects the pressure differential sensed by the differential pressure sensor 3 is not limited to static pressure or temperature. For example, in addition to static pressure and temperature, an electric signal in accordance with the humidity may also be applied to the A/D converting device 2.

Figure 3:
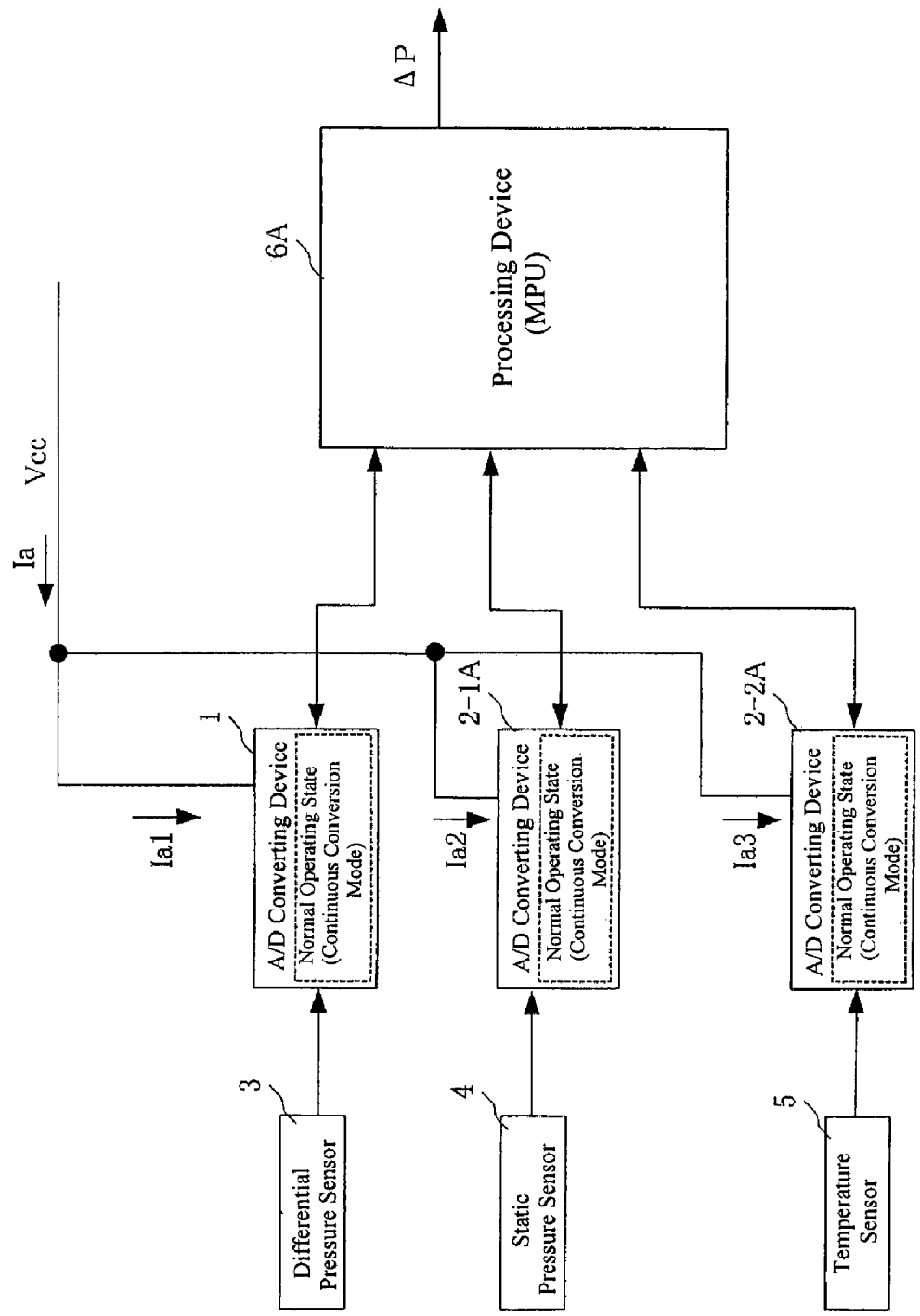
FIG. 3 is a diagram illustrating an example wherein two A/D converting devices are provided as the second A/D converting device, and wherein the first A/D converting device and the second A/D converting devices are in the constantly operating state.
Figure 4A:
FIG. 4A is a diagram illustrating the changes in the current Ia1 consumed by a first A/D converting device in the differential pressure transmitting device illustrated in FIG. 3.
Figure 4B:
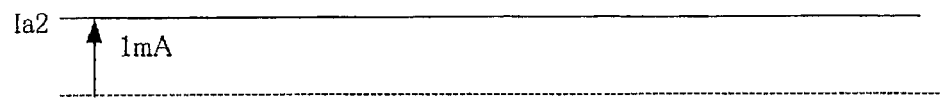
FIG. 4B is a diagram illustrating the changes in a current Ia2 consumed by a second A/D converting device in the differential pressure transmitting device illustrated in FIG. 3.
Figure 4C:
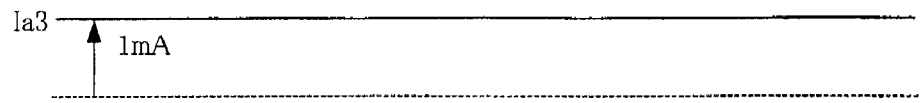
FIG. 4C is a diagram illustrating the changes in a current Ia3 consumed by a second A/D converting device in the differential pressure transmitting device illustrated in FIG. 3.
Figure 4D:
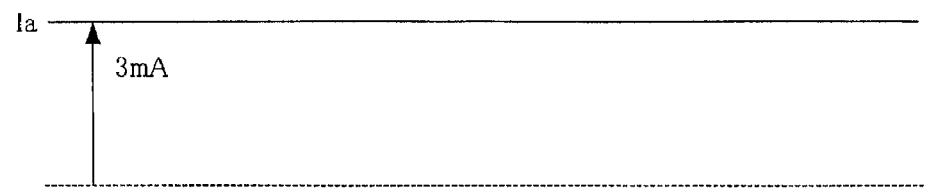
FIG. 4D is a diagram illustrating the changes in the total current Ia consumed that is the sum of the current Ia1 consumed by a first A/D converting device and the currents Ia2 and Ia3 consumed by the second A/D converting devices in the differential pressure transmitting device illustrated in FIG. 3.

Furthermore, while in the present example the electric signal in accordance with the static pressure, from the differential pressure sensor 4, and the electric signal in accordance with the temperature, from the temperature sensor 5, are applied to a single A/D converting device 2, instead, as illustrated in FIG. 3, there may be two second A/D converting devices, an A/D converting device 2-1A and an A/D converting device 2-2A, where an electric signal in accordance with the static pressure is applied from the static pressure sensor 4 to the A/D converting device 2-1A, and an electric signal in accordance with the temperature from the temperature sensor 5 may be applied to the A/D converting device 2-2A.

In this case, if the first A/D converting device 1 and the second A/D converting devices 2-1A and 2-2A are in the constantly operating state, then the total current Ia consumed, which is the combination of the current Ia1 consumed of the first A/D converting device 1 and the currents Ia2 and Ia3 consumed of the second A/D converting devices 2-1A and 2-2A, will always be a constant value (as illustrated in FIG. 4A through FIG. 4D), enabling stabilized A/D conversion values to be obtained from all of the A/D converting devices.

Figure 5:
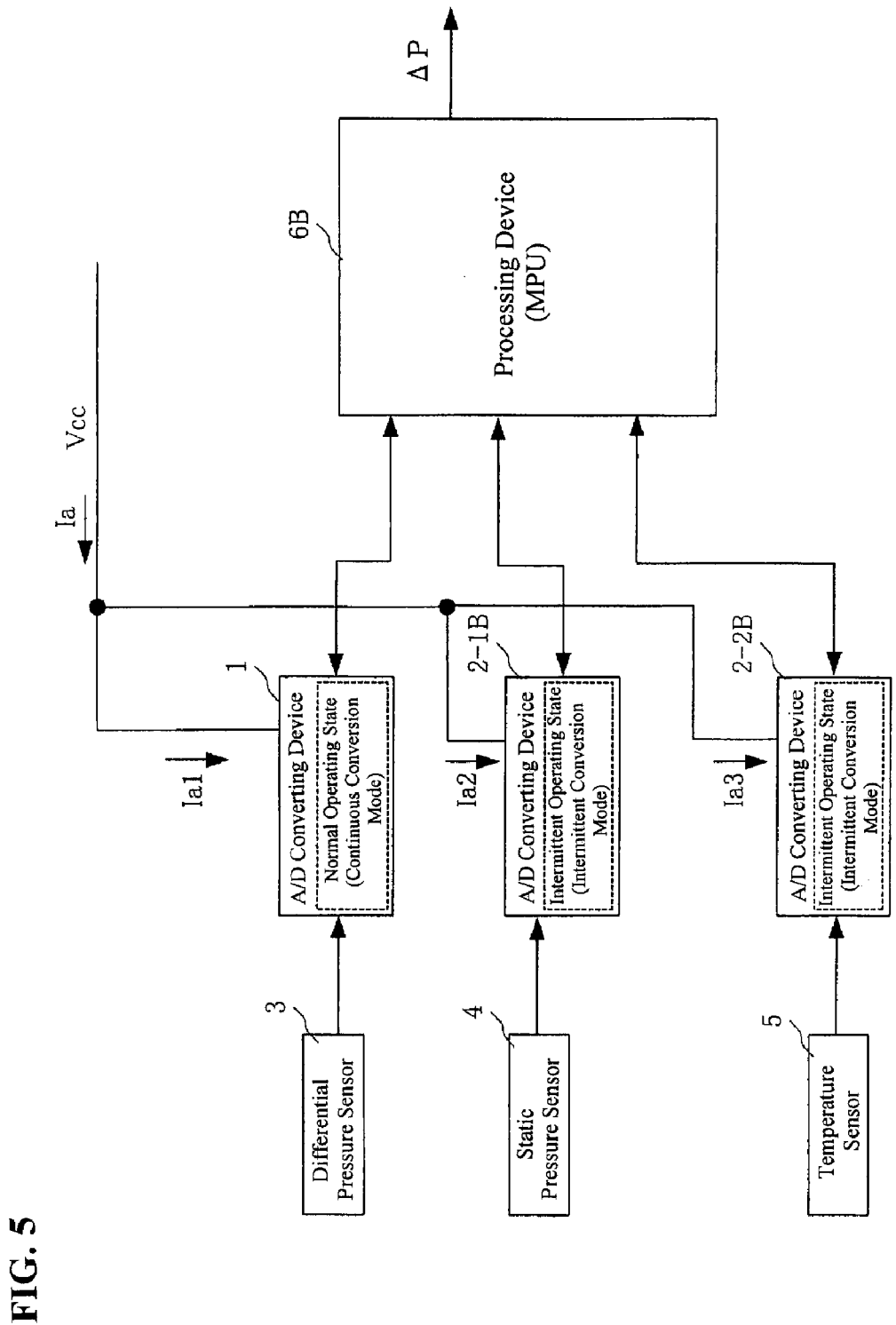
FIG. 5 is a diagram illustrating an example wherein two A/D converting devices are provided as the second A/D converting device, wherein the first A/D converting device is in the constantly operating state, and the second A/D converting devices are in intermittent operating states with a combined schedule.
Figure 6A:
FIG. 6A is a diagram illustrating the changes in the current Ia1 consumed by a first A/D converting device in the differential pressure transmitting device illustrated in FIG. 5.
Figure 6B:
FIG. 6B is a diagram illustrating the changes in a current Ia2 consumed by a second A/D converting device in the differential pressure transmitting device illustrated in FIG. 5.
Figure 6C:
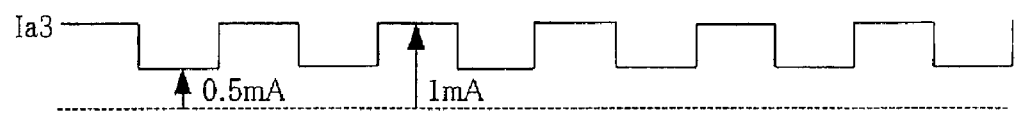
FIG. 6C is a diagram illustrating the changes in a current Ia3 consumed by a second A/D converting device in the differential pressure transmitting device illustrated in FIG. 5.
Figure 6D:
FIG. 6D is a diagram illustrating the changes in the total current Ia consumed that is the sum of the current Ia1 consumed by a first A/D converting device and the currents Ia2 and Ia3 consumed by the second A/D converting devices in the differential pressure transmitting device illustrated in FIG. 5.

Note that, as illustrated in FIG. 5, the total current consumed Ia, which is the combination of the current Ia1 consumed by the first A/D converting device and the currents Ia2 and Ia3 consumed by the second A/D converting devices 2-1B and 2-2B, may be caused to be uniform by having the first A/D converting device 1 be in a constantly operating state and the second A/D converting devices 2-1B and 2-2B be in intermittently operating states wherein the schedules are combined so that the total value for the currents Ia2 and Ia3 consumed will be constant.

FIG. 6A through FIG. 6D illustrate timing charts for the intermittent operating statuses of the second A/D converting devices 2-1B and 2-2B, with the combined schedule. In this example, the second A/D converting devices 2-1B and 2-2B are switched intermittently between the standby state and the operating state so that the interval of the standby state (wherein the current consumption=0.5 mA) and the interval of the operating state (wherein the current consumption=1 mA) are overlapped.

Note that such a schedule may be set by the processing device 6 into the A/D converting devices 2-1B and 2-2B, or may be set into the A/D converting devices 2-1B and 2-2B at the time of shipping from the factory.

Doing so causes the total current Ia consumed that is the combination of the current Ia1 consumed by the first A/D converting device 1, and the currents Ia2 and Ia3 consumed by the second A/D converting devices 2-1B and 2-2B to be 2.5 mA, to be a constant value.

While the total current Ia consumed when all three of the A/D converting devices are in the constantly operating state would be 3 mA in this example, the total current consumed Ia can be reduced to 2.5 mA, reducing the current consumption.

Figure 7:
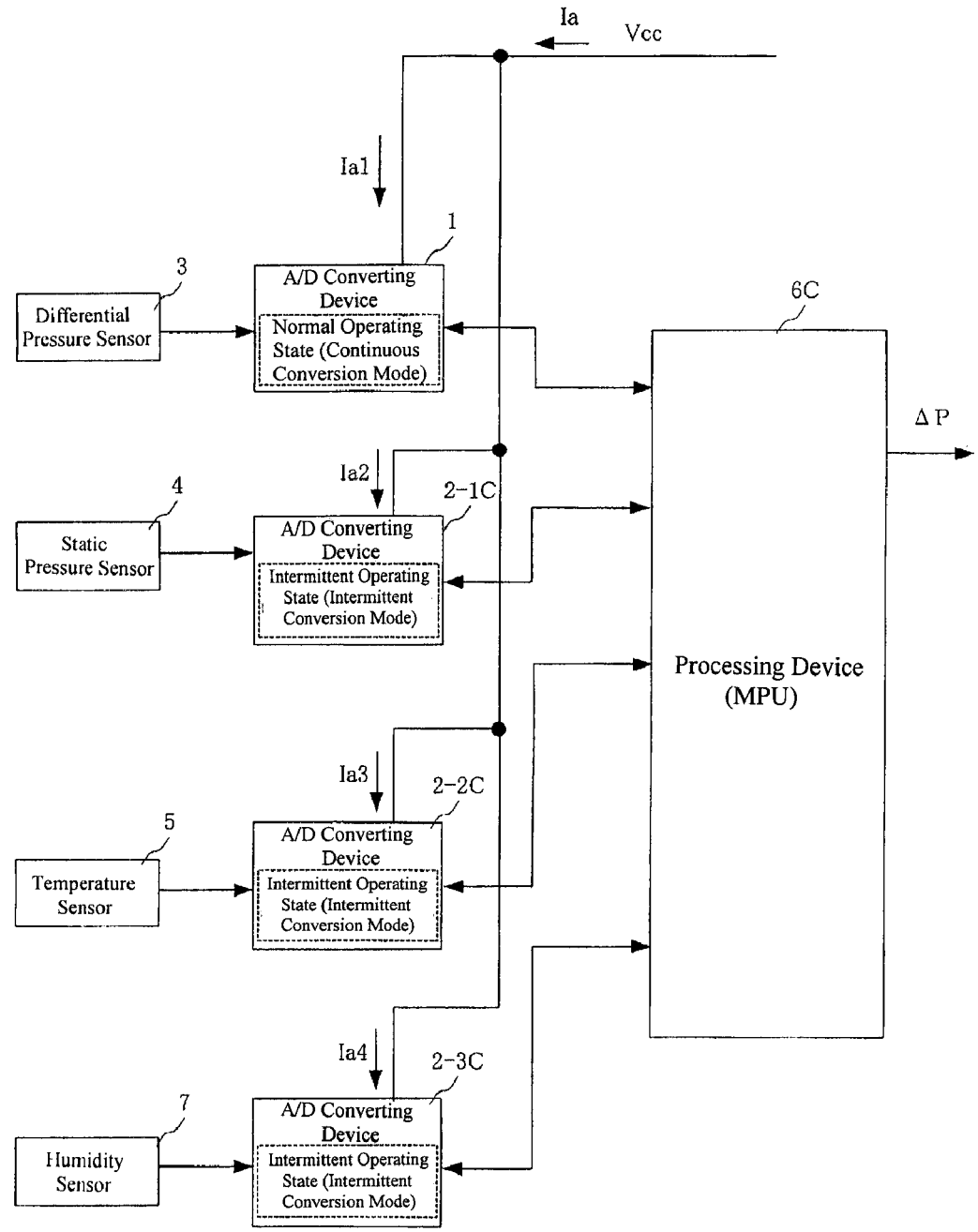
FIG. 7 is a diagram illustrating an example wherein three A/D converting devices are provided as the second A/D converting device, wherein the first A/D converting device is in the constantly operating state, and the second A/D converting devices are in intermittent operating states with a combined schedule.
Figure 8A:
FIG. 8A is a diagram illustrating the changes in the current Ia1 consumed by a first A/D converting device in the differential pressure transmitting device illustrated in FIG. 7.
Figure 8B:
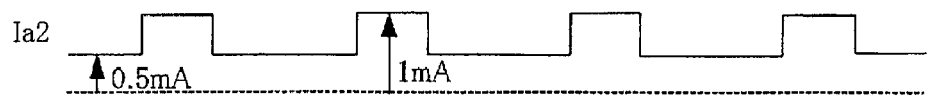
FIG. 8B is a diagram illustrating the changes in a current Ia2 consumed by a second A/D converting device in the differential pressure transmitting device illustrated in FIG. 7.
Figure 8C:
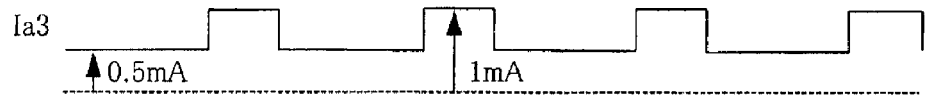
FIG. 8C is a diagram illustrating the changes in a current Ia3 consumed by a second A/D converting device in the differential pressure transmitting device illustrated in FIG. 7.
Figure 8D:
FIG. 8D is a diagram illustrating the changes in a current Ia4 consumed by a second A/D converting device in the differential pressure transmitting device illustrated in FIG. 7.
Figure 8E:
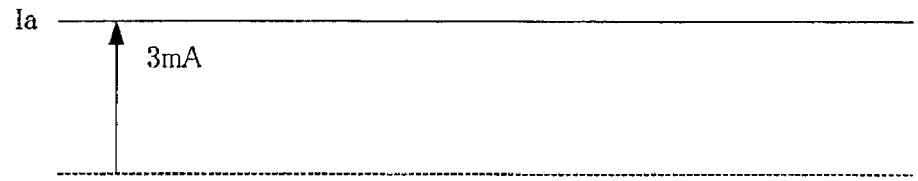
FIG. 8E is a diagram illustrating the changes in the total current Ia consumed that is the sum of the current Ia1 consumed by a first A/D converting device and the currents Ia2, Ia3, and Ia4 consumed by the second A/D converting devices in the differential pressure transmitting device illustrated in FIG. 7.

FIG. 7 illustrates an example wherein the second A/D converting device is divided into three A/D converting devices: the A/D converting device 2-1C, the A/D converting device 2-2C, and the A/D converting device 2-3C, wherein an electric signal in accordance with the static pressure is applied from the static pressure sensor 4 to the A/D converting device 2-1C, an electric signal in accordance with the temperature is applied from the temperature sensor 5 to the A/D converting device 2-2C, and an electric signal in accordance with the humidity is applied from a humidity sensor 7 to the A/D converting device 2-3C.

In this case as well, while the first A/D converting device 1 is in the constantly operating state, the second A/D converting devices 2-1C, 2-2C, and 2-3C, wherein the schedules are combined so that the total value for the currents Ia2, Ia3, and Ia4 will be a constant value, making it possible to cause the total current Ia consumed, which is the combination of the current Ia1 consumed by the first A/D converting device 1, and the currents Ia2, Ia3, and Ia4 consumed by the second A/D converting devices 2-1C, 2-2C, and 2-2AD, to be a constant value.

FIG. 8A through FIG. 8E illustrate timing charts for the intermittent operating statuses of the second A/D converting devices 2-1, 2-2, and 2-3, with the combined schedule. In this example, the second A/D converting devices 2-1C, 2-2C, and 2-3C are switched intermittently between the standby state and the operating state so that the interval of the standby state of two of the A/D converting devices (wherein the current consumption=0.5 mA) and the interval of the operating state of one of the A/D converting devices (wherein the current consumption=1 mA) are overlapped.

Note that such a schedule may be set by the processing device 6 into the A/D converting devices 2-1C, 2-2C, and 2-3C, or may be set into the A/D converting devices 2-1C, 2-2C, and 2-3C at the time of shipping from the factory.

Doing so causes the total current Ia consumed that is the combination of the current Ia1 consumed by the first A/D converting device 1, and the currents Ia2, Ia3, and Ia4 consumed by the second A/D converting devices 2-1C, 2-2C, and 2-3C to be 3 mA, to be a constant value.

While the total current Ia consumed when all four of the A/D converting devices are in the constantly operating state would be 4 mA in this example, the total current consumed Ia can be reduced to 3 mA, reducing the current consumption.

Note that while in the example of embodiment set forth above the explanation was for the case of a differential pressure transmitting device as one example of a measuring device, the measuring device is not limited to a differential pressure transmitting device, but rather may be applied to various types of measuring devices that use a plurality of A/D converting devices in the same manner.

The measuring device according to the present invention can be used in a variety of fields, such as in process control.

What is claimed is:

1. A measuring instrument comprising:
a differential pressure sensor sensing a pressure differential between fluids;
an environment sensor sensing a physical quantity that indicates a change in an environment that has an effect on the differential pressure sensed by the differential pressure sensor;
a first A/D converting device, which receives a supply of a power supply voltage and is in a constantly operating state, converting an inputted analog signal from the differential pressure sensor into a digital signal;
a second A/D converting device, which receives a common power supply voltage, with the power supply voltage to the first A/D converting device being the common power supply voltage, to be in a constantly operating state, converting an inputted analog signal from the environment sensor into a digital signal; and
a processing device sampling, with a first period, an A/D converted value that has been converted into the digital signal by the first A/D converting device, and for sampling, with a second period that is longer than the first period, an A/D conversion value that has been converted into the digital signal in the second A/D converting device.

2. A measuring instrument comprising:
a differential pressure sensor sensing a pressure differential between fluids;
a plurality of environment sensors sensing physical quantities that indicates changes in an environment that has an effect on the differential pressure sensed by the differential pressure sensor;
a first A/D converting device, which receives a supply of a power supply voltage and is in a constantly operating state, converting an inputted analog signal from the differential pressure sensor into a digital signal;
a second A/D converting device, which receives a common power supply voltage, with the power supply voltage to the first A/D converting device being the common power supply voltage, to be in a constantly operating state, converting, into digital signals, inputted analog signals that are in accordance with physical quantities sensed by the plurality of environment sensors; and
a processing device sampling, with a first period, an A/D converted value that has been converted into the digital signal by the first A/D converting device, and sampling, with a second period that is longer than the first period, an A/D conversion value that has been converted into the digital signal in the second A/D converting device.

3. A measuring instrument comprising:
a differential pressure sensor sensing a pressure differential between fluids;
a plurality of environment sensors sensing physical quantities that indicates changes in an environment that has an effect on the differential pressure sensed by the differential pressure sensor;
a first A/D converting device, which receives a supply of a power supply voltage and is in a constantly operating state, converting an inputted analog signal from the differential pressure sensor into a digital signal;
a plurality of second A/D converting devices, each receiving a common power supply voltage, with the power supply voltage to the first A/D converting device being the common power supply voltage, to be in a constantly operating state, converting, into respective digital signals, respective inputted analog signals that are in accordance with physical quantities sensed by the plurality of environment sensors; and
a processing device sampling, with a first period, an A/D converted value that has been converted into the digital signal by the first A/D converting device, and sampling, with a second period that is longer than the first period, A/D conversion values that have been converted into the digital signals in the plurality of second A/D converting devices.

4. A measuring instrument comprising:
a differential pressure sensor sensing a pressure differential between fluids;
a plurality of environment sensors sensing physical quantities that indicates changes in an environment that has an effect on the differential pressure sensed by the differential pressure sensor;
a first A/D converting device, which receives a supply of a power supply voltage and is in a constantly operating state, converting an inputted analog signal from the differential pressure sensor into a digital signal;
a plurality of second A/D converting devices, each receiving a common power supply voltage, with the power supply voltage to the first A/D converting device being the common power supply voltage, to be in intermittent operating states wherein schedules combine so that a total value for a sum of currents consumed thereby will be a constant value, converting, into respective digital signals, respective inputted analog signals that are in accordance with physical quantities sensed by the plurality of environment sensors; and
a processing device sampling, with a first period, an A/D converted value that has been converted into the digital signal by the first A/D converting device, and sampling, with a second period that is longer than the first period, A/D conversion values that have been converted into the digital signals in the plurality of second A/D converting devices.

* * * * *